P. N. LINDSKOG.
AUTOMATIC DUMP WAGON.
APPLICATION FILED APR. 13, 1908.

931,936.

Patented Aug. 24, 1909.
3 SHEETS—SHEET 1.

Witnesses:
M. J. McNeil
J. S. Ellsworth

Inventor
Peter N. Lindskog
by
P. J. Elliott
his Attorney

P. N. LINDSKOG.
AUTOMATIC DUMP WAGON.
APPLICATION FILED APR. 13, 1908.

931,936.

Patented Aug. 24, 1909.
3 SHEETS—SHEET 2.

Witnesses
M. F. McNeil
J. S. Hanworth

Inventor
Peter N. Lindskog
by R. J. Elliott
his Attorney

P. N. LINDSKOG.
AUTOMATIC DUMP WAGON.
APPLICATION FILED APR. 13, 1908.
931,936.
Patented Aug. 24, 1909.
3 SHEETS—SHEET 3.
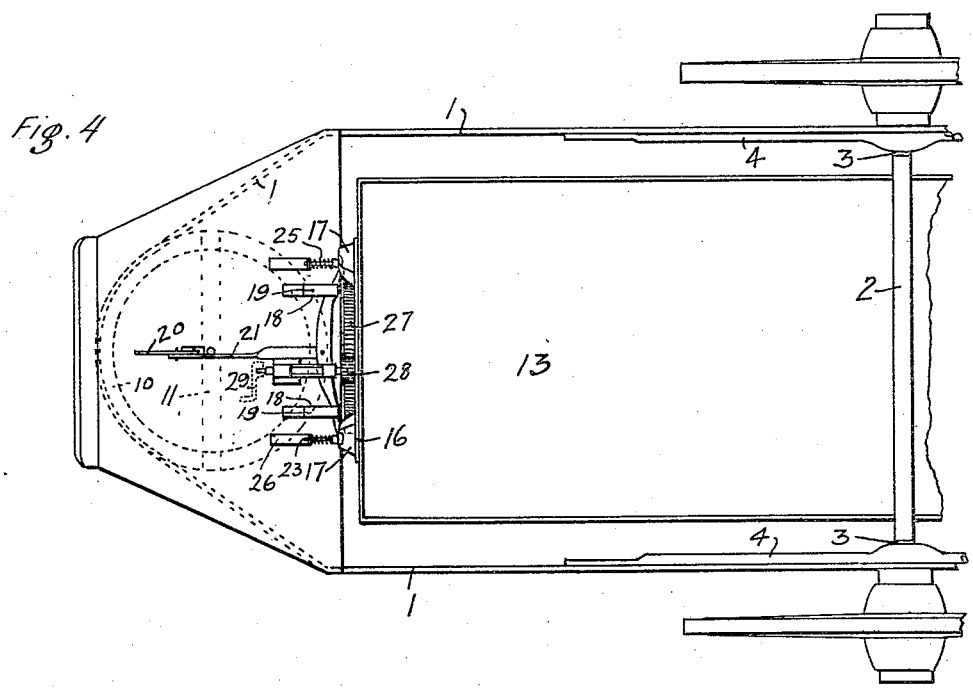
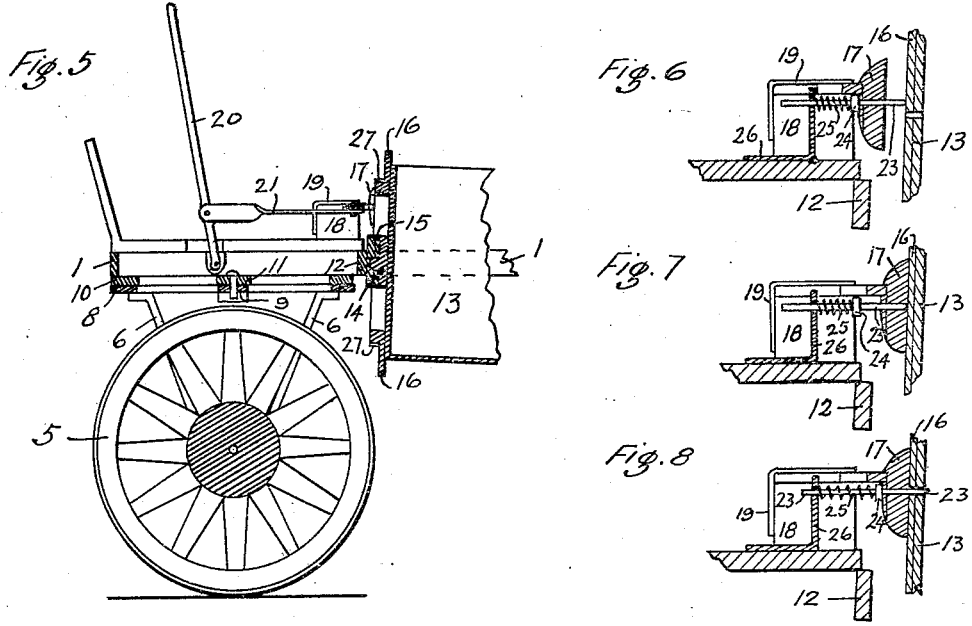
Witnesses:
M. F. McNeil
J. S. Elsworth
Inventor
Peter N. Lindskog
by R. J. Elliott
his Attorney

UNITED STATES PATENT OFFICE.

PETER N. LINDSKOG, OF TACOMA, WASHINGTON.

AUTOMATIC DUMP-WAGON.

931,936.

Specification of Letters Patent.   Patented Aug. 24, 1909.

Application filed April 13, 1908.   Serial No. 426,908.

*To all whom it may concern:*

Be it known that I, PETER N. LINDSKOG, a citizen of the United States of America, residing at Tacoma, in the county of Pierce and State of Washington, have invented certain new and useful Improvements in Automatic Dump-Wagons, of which the following is a specification, reference being had therein to the accompanying drawing.

This invention relates to improved dump wagons, and especially to wagons which will not leak through their bottom.

It has for its objects to provide a wagon which will automatically dump its load, and having dumped its load, will automatically return to its normal position.

Further objects are to provide a lock for holding it in its normal position; braking means to retard its motion; means for dumping the load when the load is insufficient in quantity to operate the wagon automatically; and to so improve the frame and running-gear that the wagon may be made very cheaply and will be easily maintained.

I attain these objects by the devices and mechanisms illustrated in the accompanying drawings, in which—

Figure 1:
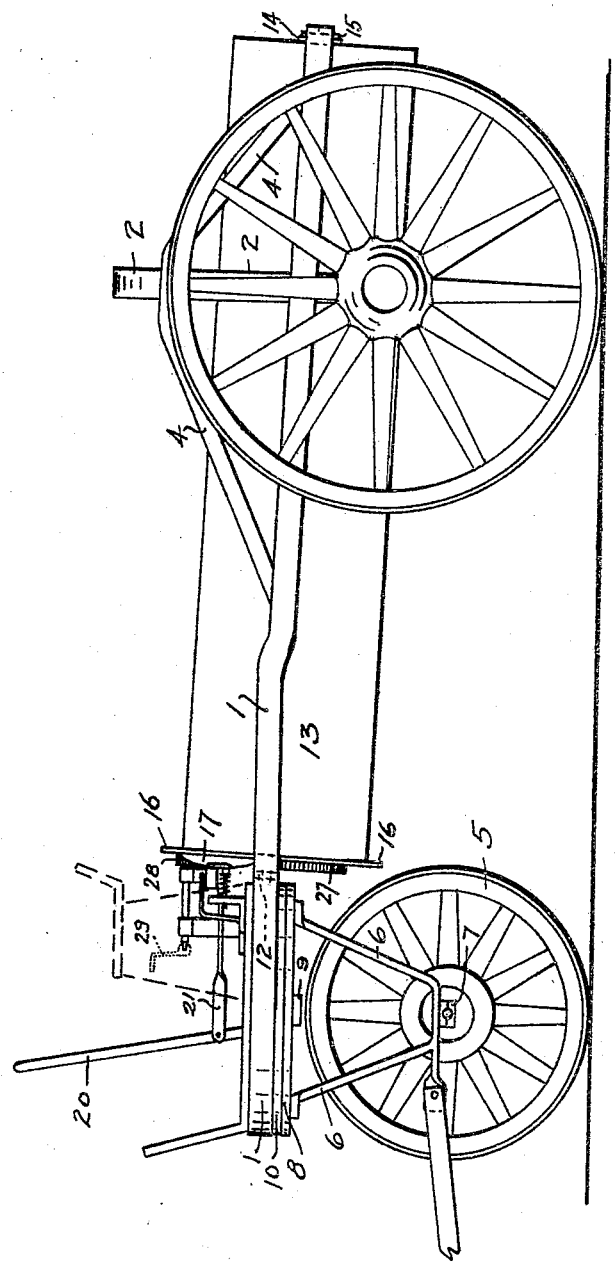
Figure 2:
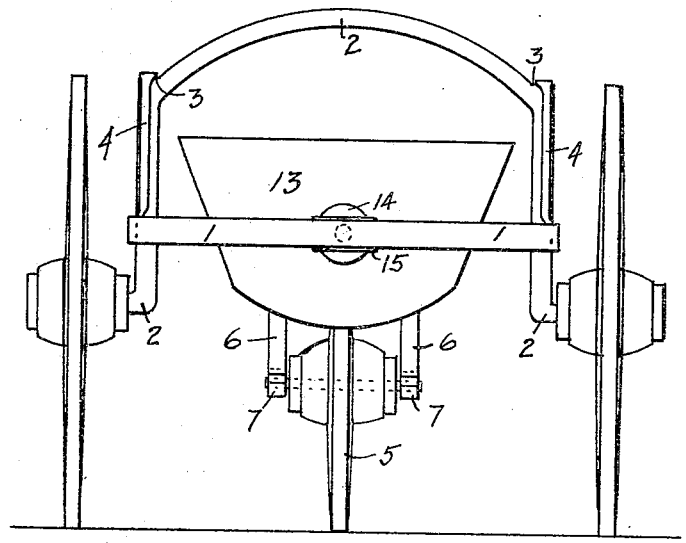
Figure 3:
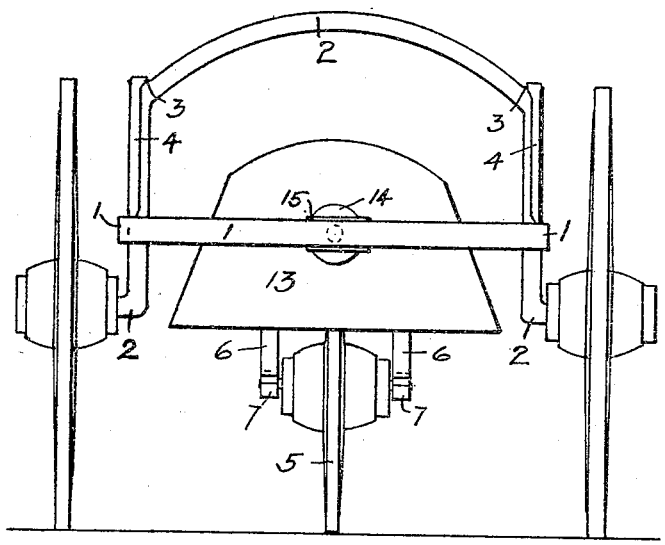

Figure 1 is a side elevation of my dump wagon; Fig. 2 is a rear elevation thereof showing the wagon box in its normal position; Fig. 3 is a similar view showing the wagon box inverted; Fig. 4 is a plan of a part of the dump wagon; Fig. 5 is a vertical section of the front end thereof; Figs. 6, 7 and 8 are vertical sections through the locking device, showing said device in position, respectively, to allow the wagon to dump its load, to brake the dumping action, and locking the wagon box in its normal position.

Similar numerals of reference refer to similar parts throughout the several views.

Essentially, this dump wagon consists of a box supported at its ends by pivots and adapted to rotate thereon, the shape of said box being such that when it is empty the center of gravity of the empty box is between the pivots and the bottom of the box, and such that when the box is loaded the center of gravity of the load and box is between the pivots and the top of the box. This box is supported on a frame mounted, preferably, on three wheels, the two rear wheels being connected together by an axle which passes over the top of the box at a sufficient distance therefrom to allow the sides of the box to swing thereunder, and the front wheel being mounted in a bracket secured to a turntable mounted under a similar ring secured to the frame of the wagon, both of said rings being secured together by a suitable king bolt. The dump wagon thus formed is held in its normal position by means of a lock-bolt which passes through a suitable hole in the box and which is carried by the brakes which retard its turning movement.

The action of the box is very rapid and under some circumstances it is best to retard it, and I have therefore provided a friction plate secured to the front end of the box and adapted to be engaged by two brake-shoes, mounted on the front platform of the wagon, said shoes being normally in contact with the friction disk but being adapted to be withdrawn therefrom. If there should be insufficient load in the wagon to raise the center of gravity above the pivot, the wagon will not dump itself when the lock-bolts have been withdrawn therefrom, and I have therefore provided a gear mounted concentric with the friction disk and secured to the dump wagon, said gear being engaged by a pinion suitably mounted above the front platform, and since the gear will normally not be used, I provide a removable handle therefor whereby, when the handle is connected to the pinion, the wagon box can be revolved to dump the load.

Referring now more particularly to the drawings, the frame 1 consists of a strap, preferably of metal, extending entirely around the box and the front platform. This frame is supported, at a point about one-third of the distance forward from its rear end, by the bent axle 2 which is secured to the inner side of the frame and which is bent substantially as shown in the drawings so as to provide axles for the wheels at its ends and shoulders 3 at about the height of the top of the wheels. The connection between the frame 1 and the bent axle 2 is reinforced on each side of the frame by means of the braces 4 secured at each end to the inner side of the frame 1 and passing over, and secured to, the shoulder 3 of the axle 2. The front wheel 5 is mounted between the brackets 6, the axle thereof being engaged by the boxes 7 secured to the brackets 6. The brackets 6 are firmly secured to the under side of the horizontal turntable 8 which has a cross strap 9 extending diametrically across it. The turntable 8 is mounted under a similar circular table 10 which has a similar strap 11 across it. A king bolt passes through the centers of these two straps 9 and 11 and secures the turntable 8 to the wagon. The frame 1 is secured to the upper table 10. The tongue is secured by any suitable means to the brackets 6, preferably about in line with the axle of the wheel 5. A strap 12 extends across the frame 1 at the rear of the above described turntable and is adapted to carry the front end of the wagon box.

The wagon box 13 is preferably made in substantially the same shape as shown in the drawings, although any shape which will fulfil the conditions, as above laid down, whereby the released unloaded box will assume the position shown in Fig. 2 and the released loaded box will assume the position shown in Fig. 3 may be substituted therefor. This box 13 may be constructed with solid sides, bottom and ends so that it will not leak even if it should be loaded with a liquid. The box is supported at its ends by two pivots which are located in accordance with the above requirements and are on its center line. The pivots are formed on castings 14 secured to the box and engage in castings 15 secured respectively to the rear part of the frame 1 and to the cross strap 12. The box is perfectly free to rotate on these pivots, except as controlled by the hereinafter described mechanism.

A friction disk 16 is secured to the front end of the box 13 concentrically with the front pivot thereof. Two brake-shoes 17 are secured to the ends of a brake-beam and are adapted to engage the friction disk 16. The brake-beam is supported by suitable blocks 18 and is kept down thereon by straps 19 secured thereto, but is free to be moved horizontally between the blocks 18 and the straps 19. A hand lever 20 is pivoted to the front platform and is connected to the brake-beam by means of a link 21. A toothed ratchet is mounted adjacent to the hand lever 20 so that the lever when being engaged thereby cannot be accidentally moved to release the brake-shoes 17.

When the dump wagon is in its normal position it is locked therein by two spring-actuated bolts 23 which pass through the brake-shoes 17 and through holes in the friction disk 16 so that the disk and the wagon box cannot move relatively to the brake-shoes which are themselves fastened to the wagon. These bolts 23 have collars 24 adjacent to the brake-shoes when the ends of said bolts are in the holes above mentioned. Springs 25 are compressed between the collars 24 and suitable guide brackets 26 secured to the wagon platform. The result of this arrangement is that when the brake-beam is drawn forward the shoes will engage the collars 24 of the bolts 23 and will draw them forward, but the bolts 23 will not allow the box 13 to turn on its pivot, even though the shoes 17 are withdrawn entirely from the friction disk 16, until the shoes 17 have drawn the bolts 23 entirely out of the holes. The box is then free to rotate. If it turns too fast the hand lever 20 is immediately drawn back so that the brake-shoes 17 will engage the friction disk 16 and will retard its rotation, but the bolts 23 will be forced to retain their withdrawn positions, the collars 24 thereof being separated from the brake-shoes. When the loaded box 13 thus turns on its pivot it drops the load immediately below it in such a position that the rear wheels will scarcely touch the pile thus dumped. As soon as the load is thus dumped, the center of gravity which is now above the pivots will tend to turn the box 13 until it is in its normal position. To accomplish this it will usually be found best to withdraw the brake-shoes 17 entirely from the friction disk 16 and then apply them thereto as soon as the box 13 has attained its normal position. When the brake shoes 17 then move to engage the friction disk 16 the lock-bolts 23 will enter the holes above mentioned and will lock the box 13 in this position so that it may be filled again.

A gear wheel 27 is mounted on the front end of the wagon box 13 concentric with its pivot and is preferably of smaller diameter than the friction disk 16 and extends out therefrom. A pinion 28 is mounted on suitable brackets secured to the front platform and the end of the spindle thereof is preferably square. A handle 29 is provided and is adapted to engage the squared end of said spindle so that when the handle 29 is attached thereon the spindle and pinion may be turned thereby. This handle 29 is readily removable from the spindle and is normally not mounted thereon. As above mentioned, the object of this pinion and gear is to turn the box 13 when there is insufficient load therein to turn it automatically.

There are many advantages to the wagon I have devised, among which may be mentioned the three-wheel construction which allows it to be turned in a very short radius, and this is especially useful when the load has been dumped and the wagon must be removed from the dump pile without the extra labor to make it pass through piles of loose materials, such as is the case if it cannot turn on a short radius. Another advantage is that the wagon box can be hung at a lower level than is usual with such wagons and therefore, if it is filled by laborers shoveling from the level of the ground, they do not have to raise their loads as high as they otherwise would, thus saving much energy on each shovelful, which in the aggregate may amount to very considerable. Further, the position of the rear axle is such that a larger portion of the weight of the load is carried thereby than is usual with dump wagons, this results in a saving in the power necessary to haul the wagons.

Having described my invention what I claim is:

In a dump wagon, the combination of a frame encircling the wagon box; a wagon box pivoted at its front and rear ends to said frame; a pivoted support under the front end of said frame; a pair of side supports for said frame intermediate of its ends; a bent bar passing over the wagon box and joining said side supports; lock bolts mounted on the frame and adapted to enter suitable holes in the end of said wagon box to prevent its turning on its pivots; and brake shoes mounted on the frame and adapted to engage the wagon box and to retard the turning thereof on its pivot.

In testimony whereof I affix my signature in presence of two witnesses.

PETER N. LINDSKOG.

Witnesses:
JAMES GORMAN,
T. J. FRANKLIN.